United States Patent [19]
Bye et al.

[11] 3,860,681
[45] Jan. 14, 1975

[54] METHOD OF MAKING SYNTHETIC AGGREGATES

[75] Inventors: Gerald Charles Bye, Gravesend; Richard Charles Hack, Welling; Anthony Robin Pennell, Gravesend, all of England

[73] Assignee: The Associated Portland Cement Manufacturers Limited, London, England

[22] Filed: July 31, 1972

[21] Appl. No.: 276,669

[30] Foreign Application Priority Data
Apr. 26, 1971 Great Britain.................... 11291/71

[52] U.S. Cl...................... 264/66, 106/67, 264/141
[51] Int. Cl....................... C04b 31/20, C04b 33/32
[58] Field of Search........... 264/56, 65, 141; 106/67

[56] References Cited
UNITED STATES PATENTS

| | | | |
|---|---|---|---|
| 1,920,773 | 8/1933 | Walton................................. | 264/56 |
| 2,694,245 | 11/1954 | Rogers et al.......................... | 264/56 |
| 3,202,746 | 8/1965 | Day et al. ............................. | 264/56 |

OTHER PUBLICATIONS
Kingery, Introduction to Ceramics, 1960, page 47.

*Primary Examiner*—Robert F. White
*Assistant Examiner*—Thomas P. Pavelko
*Attorney, Agent, or Firm*—Baldwin, Wight & Brown

[57] ABSTRACT

A method for the production of a synthetic roadstone comprising forming a raw material or mixture of raw materials into a moist plastic mass, extruding it through an extrusion die, sintering the extruded material, and breaking up the sintered material to form an aggregate of a desired particle size, the improvement which comprises selecting the moisture content of the raw material, the form of the extrusion die and the rate of extrusion so as to cause severe "fir-coning" of the extruded material, whilst selecting the sintering temperature so as to be sufficiently low not to destroy the surface texture imparted by the "fir-coning."

3 Claims, 1 Drawing Figure

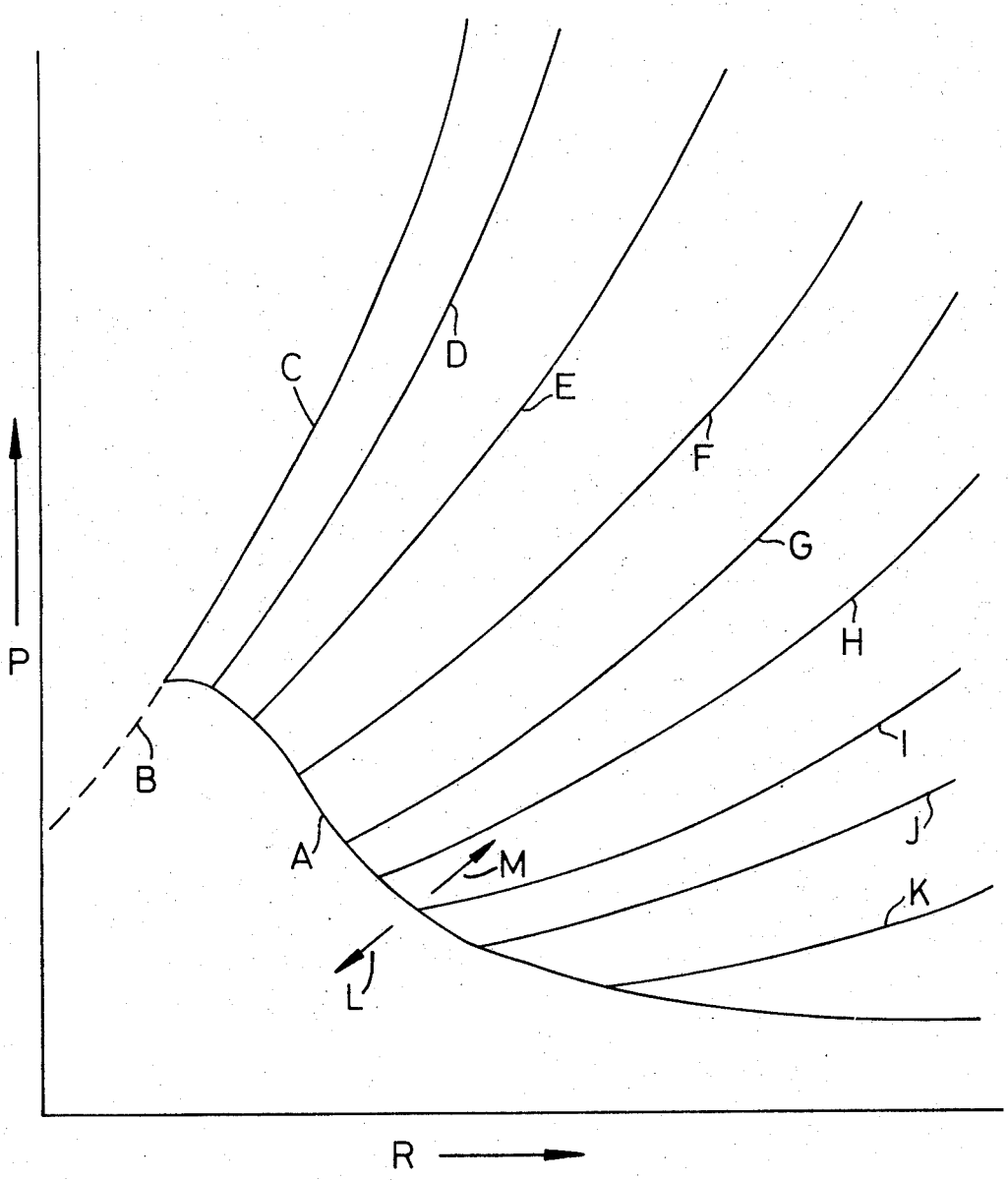

METHOD OF MAKING SYNTHETIC AGGREGATES

This invention relates to synthetic aggregates suitable for use as roadstone and produced by sintering a suitable raw material or mixture of raw materials.

To be suitable for use as a roadstone, a material must possess a resistance to polishing (i.e., have a high "polished stone value" (PSV); this being for more exacting applications preferably greater than 65) and simultaneously have a good resistance to abrasion (i.e. have a low "aggregate abrasion value" (AAV), which should be less than 20 and preferably less than 15, whilst British Government specifications require an AAV of less than 12 for trunk road surfaces). Synthetic materials can fairly readily be produced to fulfil either one of these requirements, but not so readily to comply simultaneously with both. Values for P.S.V. and A.A.V. referred to throughout this specification were measured by the methods described in British Standard Specification No. 812.

The object of the present invention is to provide a method of producing synthetic aggregates by sintering which, for a given raw material or mixture of raw materials, provides aggregates of increased PSV without an unacceptably large increase in AAV.

According to the invention, a method of producing a synthetic aggregate comprises forming a raw material or mixture of raw materials into a moist plastic mass, extruding it through an extrusion die, sintering the extruded material, and breaking up the sintered material to form an aggregate of a desired particle size, the moisture content of the raw material, the form of the extrusion die and the rate of extrusion being selected so as to cause severe 'fir-coning,' as hereinafter defined, of the extruded material, whilst the sintering temperature is selected so as to be sufficiently low not to destroy the surface texture imparted by the 'fir-coning.'

Extrusion of a plastic material before it is fired is known to have the advantage that the size and configuration of the product, being defined by the size and shape of the extrusion aperture can be pre-determined before firing so that simple breakage across the section will produce directly pieces of stone of the size and shape required for use. This minimises the material losses that conventionally arise in the crushing of a fired product in the form of fines and unsuitable flaky particles as well as reducing the amount of grading the product requires.

However, conventional extrusion processes have the disadvantage in the present application that they form a smooth outer surface on the product substantially reducing its P.S.V. as compared to surfaces provided by breaks across the extrusion section. In the method of the invention, the extrusion conditions are selected so as to promote the formation to a severe degree of a surface irregularity well known as a defect, and consequently avoided in practice, in the extrusion of brick earths. This condition is variously known as 'fir-coning' (the term used in the present specification) and "sharks teeth" and is the manifestation of normal force development in the material being extruded. When the geometry of an extrusion die orifice is satisfactory by normally applied criteria an extrudate with a smooth surface is produced. This is achieved by careful design of the entry to the die orifice and elongating the orifice, which may be either parallel sided or tapered, within the die proper. This ensures dissipation of the internal forces in the extrudate normal to the axis of extrusion by providing suitable restraint for sufficient time to allow dissipation of those forces that would otherwise disrupt the surface once the extrudate is no longer confined by the die. The present invention on the other hand exploits these natural disruptive forces and means are employed deliberately to promote their occurrence and degree. This is achieved by the use of a sharp edge at the entry to the extrusion orifice, the latter being formed in a die plate which is of small thickness compared to the dimensions of the orifice. Thus, whereas for example in conventional die plates producing, say a cylindrical extrudate, a die plate thickness to extrusion orifice diameter ratio of 1:1 or greater would be employed, it may be necessary for the prupose of this invention to use ratios down to 1/16 : 1.

Given a particular die geometry the degree of fir-coning can be controlled by varying the shear rate and the viscosity (which is related to the water content) of the material to be extruded. High values of both these parameters favour fir-coning.

The accompanying drawing illustrates schematically the way in which shear rate R, surface quality, and water content for a given material are related. Thus for lines C,D,E,F,G,H, I,J and K of constant water content, C representing a minimum water content below which the extrudate tends to break up on extrusion and K representing a maximum practicable water content, extrusion pressure is related to shear rate. Lines A, B and C indicate the conditions forming the boundaries between the formation of extrudate having a smooth surface (below lines A and B), extrudate showing surface irregularities i.e., fir-coning (above line A and to the right of line C), and extrudate which is subject to brittle fracture on extrusion (to the left of line B and C). It will be seen that increasing rates of shear are required with increasing water content if surface irregularities are to be obtained.

The extrudate may have for example a circular, square or rectangular cross section and cross sectional dimensions according to the end use requirement.

For roadstone applications a square or rectangluar die section is preferred, so that die conditions are not amenable to a theoretical calculation of shear rate in the material being extruded. Results are therefore more conveniently expressed by reference to the rate of extrusion, which increases with the rate of shear and the conditions found suitable will depend on the material employed. By way of example some results are given in the following Table of tests carried out on a siliceous bauxite. These results illustrate the way in which water content and fineness influence the extrusion process.

TABLE

The moistened bauxite was extruded using a ram extruder though a die plate having a die area of 0.25 in$^2$, a plate area of 13.85 in$^2$, and a plate thickness of 5/32 inch.

| Sieve analysis of material in terms of percentages by weight remaining on specified BS mesh sieves | | Water content % | Extrusion Pressure | | Extrusion Rate | Surface Texture of extrudate |
|---|---|---|---|---|---|---|
| | | | psi | N/mm² | g sec⁻¹ | |
| 6.9% | > 52 | 15.3 | 1000 | 6.89 | 89.3 | Good fir-coning |
| 22% | > 100 | | | | | |
| 33% | > 170 | 15.1 | 1000 | 6.89 | 83.7 | do. |
| 0.8% | > 52 | 19.7 | 600 | 4.14 | 101 | Too smooth |
| 4.4% | > 100 | 19.5 | 600 | 4.14 | 90.2 | do. |
| 15% | > 170 | 18.3 | 825 | 5.69 | 82.6 | Good fir-coning |
| | | 18.3 | 825 | 5.69 | 73.4 | do. |
| | | 18.4 | 950 | 6.55 | 50.5 | Moderate disintegration of extrudate |
| | | 18.1 | 1000 | 6.89 | 62.2 | Marked disintegration of extrudate |

The presence of fir-coning encourages breakage of the extrudate into fairly regular lengths, the gross cracks characteristic of the phenomenon facilitating further breaking up of the material in the production of finished road stone, whereas the finer defects also produced by fir-coning are significant in improving the PSV of the product by encouraging drainage of water away from the tyre-road stone contact areas so as to improve tyre adhesion in wet weather conditions.

The firing temperature utilised for burning the extrudate will of course vary according to the raw materials used and the product required, but must not be so great that the surface texture imparted by fir-coning is destroyed.

The advantages of the process involving extrusion with "fir-coning" over conventional extrusion or simple pugging with water are that it can provide a substantial improvement in P.S.V. without an unacceptable degradation of A.A.V.

This is illustrated in the following Examples:

EXAMPLE I

Two samples were made up from a mixture of calcined ferruginous bauxites of two different particle gradings, bonded with clay (18.5 percent of bauxite between 14 and 52 B.S. mesh sieves; 74 percent of bauxite having not more than 15% residue on a 100 B.S. mesh sieve; and 7.5 percent Blue London clay as a plasticiser). One sample was extruded through a conventional cylindrical die and the other through a 1/6 inch thick plate having a ½ inch square orifice. Both extrudates were fired at 1,320°–1,350°C for 20 minutes. The results obtained for P.S.V. and A.A.V. were:

| | PSV | AAV% |
|---|---|---|
| Cylindrical pieces | 64 | 1.5 |
| Fir coned square section | 81 | 5.0 |

EXAMPLE II

A ferruginous bauxite was ground to a 15 percent residue on a 100 B.S. mesh sieve. Half was pugged with water and the other half extruded as a ⅜ inch square section, through a 1/6 inch thick plate using 1 percent neutralised ammonium alginate as a plasticiser. The pug was formed into 2 inch cubes and burned at 1,400°C for 20 minutes, crushed, graded and the suitably sized material tested. The extruded material was fired at 1,360°C for 20 minutes and required minimal further breaking up with very low loss of material.

The test results obtained were:

| | PSV | AAV% |
|---|---|---|
| Pugged sample | 58 | 3.7 |
| "Fir coned" extrudate | 77 | 4.0 |

EXAMPLE III

A siliceous bauxite was ground to varying extents, indicated by one B.S. sieve retention, pugged with water and the pug extruded and fired in a kiln for 20 minutes at the temperatures indicated. As extruded the coarser samples were weak and needed an additive such as 0.1–0.2 percent by weight of carboxymethyl cellulose or neutralised ammonium alginate to aid extrusion and provide adequate green strength. The coarser material also required a somewhat higher firing temperature to produce adequate sintering. The optimum levels from the point of view of minimising grinding costs whilst maintaining satisfactory abrasion resistance would appear for this material to lie between 15 percent > 100 mesh and 15 percent > 170 mesh.

| Degree of grinding % retained on given B.S. Sieve | | Water content of pug % | Temperature firing °C | PSV | AAV % |
|---|---|---|---|---|---|
| 15% | > 25 | 15.6* | 1350 | 69 | 5.1 |
| 15% | > 52 | 16.5* | 1350 | 67 | 5.6 |
| — | | 16.9** | 1325 | 73 | 6.5 |
| 25% | > 100 | 19.6 | 1325 | 76 | 7.6 |
| | | not determined | 1300 | 72 | 11.2 |
| 15% | > 100 | 20.0 | 1300 | 73 | 5.7 |
| 15% | > 170 | not determined | 1280 | 74 | 1.6 |
| | | 20.2 | 1300 | 74 | 2.1 |
| | | 19.3 | 1265 | 71 | 2.3 |
| 15% | > 240 | 19.0 | 1250 | 70 | 2.4 |

\* 0.2% by weight carboxymethyl cellulose added to pug
\*\* 0.1% do.

The results obtained for the material giving a 15 percent residue on the 100 B.S. mesh sieve were compared with those obtained using other methods of forming aggregate from the same raw material, these results being PSV 62, AAV 5.0 percent for the fracture surfaces of conventionally extruded material and PSV 61, AAV 3.4 percent for material simply pugged, fired and crushed for testing.

It was found that by incorporating about 1 percent by weight of $P_2O_5$ in aqueous solution into the pug before extrusion improved the green strength of the extrudate and reduced dust losses during the calcination stage of the subsequent firing step without otherwise affecting the results.

We claim:

1. In a method for the production of a synthetic roadstone comprising forming a sinterable ceramic raw material into a moist plastic mass, extruding said mass through an extrusion die, thereafter sintering the extruded material, and breaking up the sintered material to form an aggregate of the desired particle size, the improvement which comprises controlling the moisture content of said raw material, the form of the extrusion die and the rate of extrusion to cause severe "fir-coning" of the extruded material, the sintering temperature being controlled whereby the surface texture imparted by the "fir-coning" is not destroyed to provide a roadstone having a PSV of above about 65, and an AAV below about 20.

2. A method according to claim 1, wherein the orifice is square or rectangular.

3. A method according to claim 1, wherein the raw material is a bauxite, and about 1 percent of $P_2O_5$ is incorporated in the moist plastic mass before extrusion.

* * * * *